(12) United States Patent
Lipscomb et al.

(10) Patent No.: US 8,960,126 B2
(45) Date of Patent: Feb. 24, 2015

(54) PUMP MODULE FOR PET FOUNTAIN

(71) Applicant: Pioneer Pet Products, LLC, Cedarburg, WI (US)

(72) Inventors: John M. Lipscomb, Cedarburg, WI (US); Qing He, North Andover, MA (US); Stanley Suring, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 13/841,861

(22) Filed: Mar. 15, 2013

(65) Prior Publication Data
US 2013/0228132 A1 Sep. 5, 2013

Related U.S. Application Data

(63) Continuation of application No. 12/887,439, filed on Sep. 21, 2010.

(60) Provisional application No. 61/244,438, filed on Sep. 21, 2009, provisional application No. 61/356,874, filed on Jun. 21, 2010.

(51) Int. Cl.
*A01K 7/00* (2006.01)
*A01K 7/02* (2006.01)
*F04B 23/02* (2006.01)
*B01D 35/30* (2006.01)

(52) U.S. Cl.
CPC ............ *A01K 7/02* (2013.01); *F04B 23/021* (2013.01); *B01D 35/30* (2013.01)
USPC .............................................. 119/74; 119/72

(58) Field of Classification Search
USPC .................................. 119/72, 74–80; 417/363
See application file for complete search history.

(56) References Cited

U.S. PATENT DOCUMENTS

| | | |
|---|---|---|
| 2,103,653 A | 12/1937 | Weil |
| 3,362,537 A | 1/1968 | Cline |
| 3,409,223 A | 11/1968 | Gosh |
| 3,746,169 A | 7/1973 | Willinger et al. |
| 3,830,596 A | 8/1974 | Kondo |
| 4,559,905 A | 12/1985 | Ahrens |

(Continued)

FOREIGN PATENT DOCUMENTS

| | | |
|---|---|---|
| CA | 682630 | 3/1964 |
| CA | 1325561 | 12/1993 |

(Continued)

*Primary Examiner* — Kristen C Hayes
(74) *Attorney, Agent, or Firm* — Boyle Fredrickson S.C.

(57) ABSTRACT

A pump module for a recirculating pet fountain having a module housing in which a pump is received in which a filter can also be removably received. The module includes a perforate intake formed in a surface of the housing located adjacent to and generally facing toward a bottom of a fountain basin in which the module is removably mounted helping to keep debris and the like from entering the module and plugging the filter. In one embodiment, the intake is a perforate grate integrally formed in a generally downwardly facing surface of the housing and the module is configured so water enters through the intake and flows upwardly through the filter before entering the pump. The downwardly facing surface of the module housing is configured so some intake perforations are closer to the basin bottom than others helping ensure at least one perforation remains under water and substantially unplugged.

35 Claims, 11 Drawing Sheets

(56) References Cited

U.S. PATENT DOCUMENTS

| | | | |
|---|---|---|---|
| 4,994,177 A | 2/1991 | Bogar, Jr. | |
| 5,052,343 A | 10/1991 | Sushelnitski | |
| 5,052,904 A | 10/1991 | Itakura et al. | |
| 5,167,368 A | 12/1992 | Nash | |
| 5,316,670 A | 5/1994 | Yao | |
| 5,326,032 A | 7/1994 | Quillin | |
| 5,501,178 A | 3/1996 | Kemp | |
| 5,799,609 A | 9/1998 | Burns et al. | |
| 6,053,422 A | 4/2000 | Polzin et al. | |
| 6,055,934 A | 5/2000 | Burns et al. | |
| 6,101,974 A | 8/2000 | Frohlich | |
| 6,149,070 A | 11/2000 | Hones | |
| 6,174,142 B1 | 1/2001 | Holt | |
| 6,212,804 B1 | 4/2001 | Richard | |
| 6,253,709 B1 | 7/2001 | King | |
| 6,257,288 B1 | 7/2001 | Davidian et al. | |
| 6,364,276 B1 | 4/2002 | Polzin et al. | |
| 6,423,218 B1 | 7/2002 | Lindermeir et al. | |
| 6,428,288 B1 | 8/2002 | King | |
| 6,439,471 B2 | 8/2002 | Ehrlich et al. | |
| 6,450,122 B1 * | 9/2002 | Frank | 119/259 |
| 6,460,483 B1 * | 10/2002 | Northrop et al. | 119/74 |
| 6,575,714 B2 | 6/2003 | Pace et al. | |
| 6,588,368 B1 | 7/2003 | Cheng | |
| 6,622,657 B2 * | 9/2003 | Northrop et al. | 119/74 |
| 6,634,316 B2 | 10/2003 | Desatoff | |
| 6,644,560 B2 | 11/2003 | Polzin et al. | |
| 6,705,540 B2 * | 3/2004 | Koshiyama et al. | 239/17 |
| 6,739,284 B1 | 5/2004 | Olive | |
| 6,916,157 B2 | 7/2005 | Leonhard | |
| 7,044,175 B1 | 5/2006 | Camejo | |
| 7,089,881 B2 * | 8/2006 | Plante | 119/74 |
| 7,270,082 B2 * | 9/2007 | Plante | 119/74 |
| 7,958,844 B1 * | 6/2011 | Northrop | 119/74 |
| D641,764 S * | 7/2011 | Lipscomb et al. | D15/7 |
| 8,171,885 B1 * | 5/2012 | Northrop et al. | 119/74 |
| 8,381,685 B2 * | 2/2013 | Lipscomb et al. | 119/74 |
| 2003/0010691 A1 | 1/2003 | Broussard | |
| 2005/0166853 A1 | 8/2005 | Plante | |
| 2005/0254963 A1 | 11/2005 | Hoffmeier | |
| 2006/0174838 A1 | 8/2006 | Plante | |
| 2006/0230676 A1 | 10/2006 | Rowe et al. | |
| 2007/0095297 A1 | 5/2007 | Boyd | |
| 2008/0078330 A1 | 4/2008 | McCallum et al. | |
| 2008/0190374 A1 | 8/2008 | Farris | |
| 2008/0261047 A1 | 10/2008 | Shibata | |
| 2010/0095897 A1 * | 4/2010 | Rowe | 119/72 |
| 2010/0098555 A1 * | 4/2010 | He | 417/18 |
| 2010/0300366 A1 * | 12/2010 | Lipscomb et al. | 119/74 |
| 2011/0067638 A1 * | 3/2011 | Lipscomb et al. | 119/74 |
| 2011/0259273 A1 * | 10/2011 | Lipscomb et al. | 119/74 |
| 2012/0137979 A1 * | 6/2012 | Lipscomb et al. | 119/74 |

FOREIGN PATENT DOCUMENTS

| | | |
|---|---|---|
| DE | 3407910 | 9/1985 |
| EP | 1264541 | 12/2002 |
| EP | 1566099 | 8/2005 |
| JP | 5-85700 | 11/1993 |

* cited by examiner

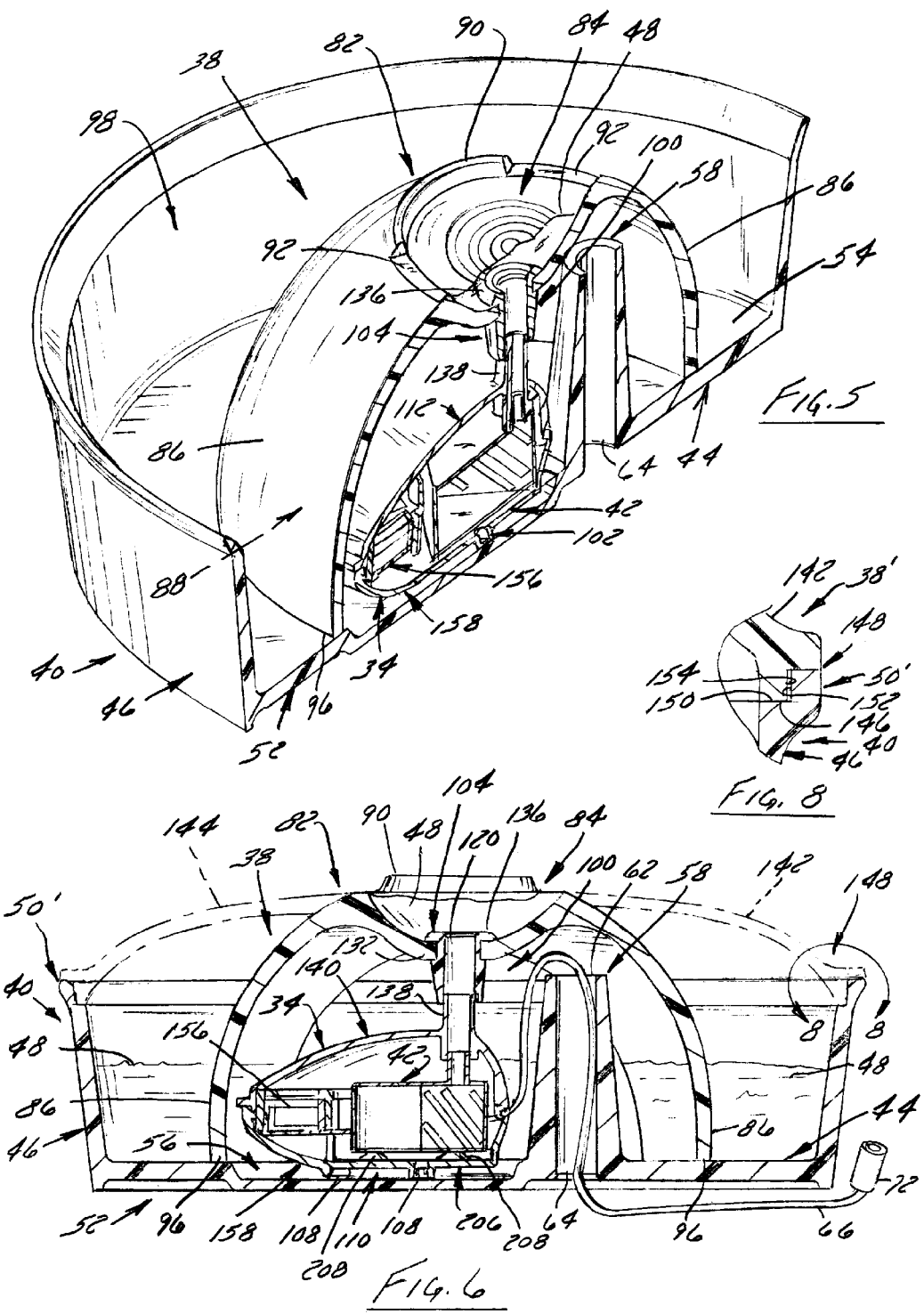

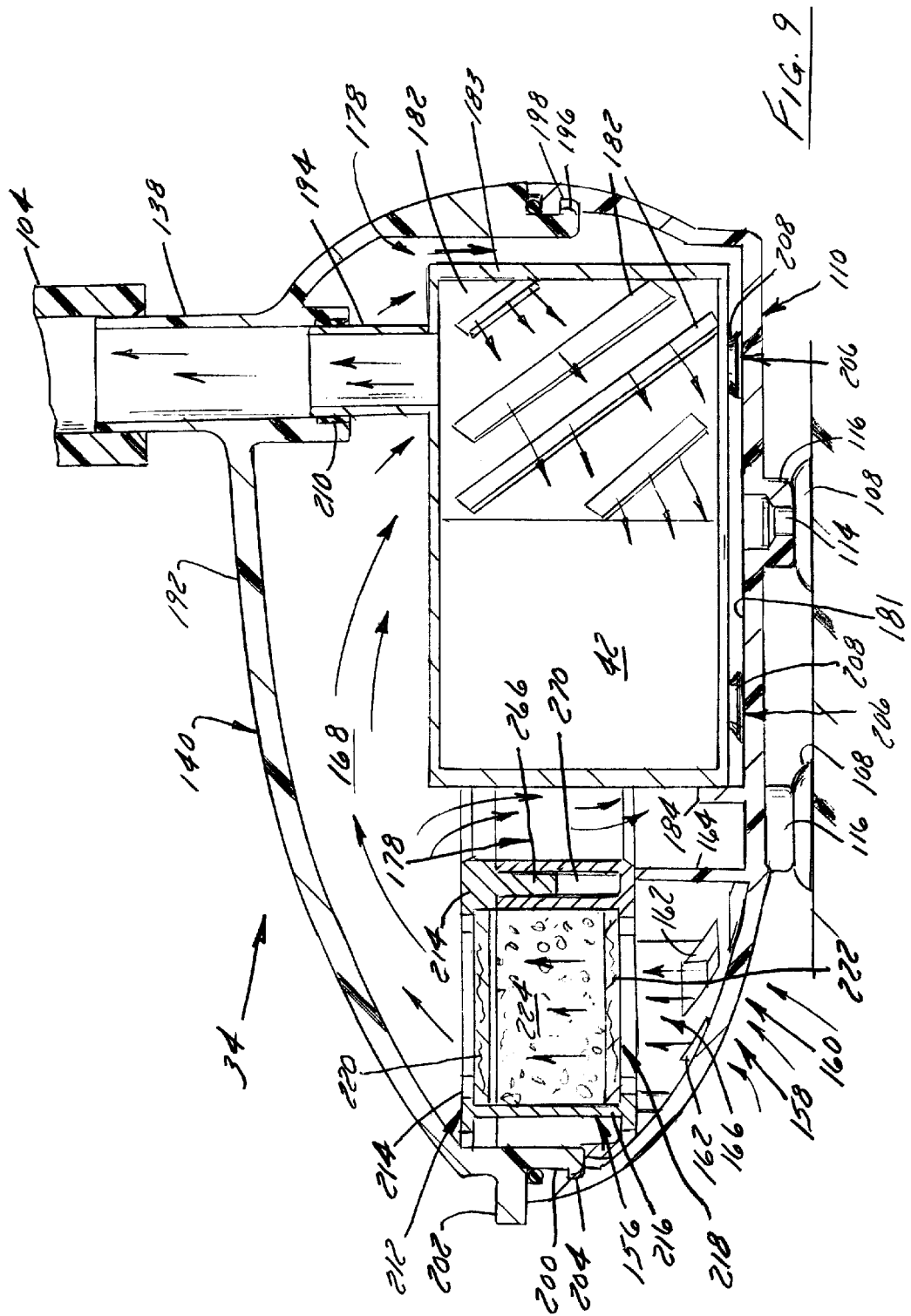

PUMP MODULE FOR PET FOUNTAIN

CROSS REFERENCE TO RELATED APPLICATION(S)

This application is a continuation of U.S. application Ser. No. 12/887,439 filed Sep. 21, 2010, which claims the benefit under 35 U.S.C. §119(e) of U.S. Provisional Application Ser. No. 61/244,438, filed Sep. 21, 2009, and U.S. Provisional Application Ser. No. 61/356,874, filed Jun. 21, 2010, the entirety of each of which is expressly incorporated by reference herein.

FIELD

The present invention relates to a pump module for a pet fountain and more particularly to a pump module for a recirculating pet fountain in which a filter can also be removably received.

BACKGROUND

There are many types of pet watering devices, including pet fountains, where an electrically powered pump is used to move water in a manner that is enticing to a pet while also helping to keep the water fresh. The pump is used to draw water from one part of the watering device and deliver it to another part of the watering device where it can flow back enabling the water to recirculate. Each watering device is configured in a manner that provides access to the water enabling a pet to drink water.

A pet fountain has a basin, at least a portion of which can be configured to allow pet drinking water access. The fountain typically also has a cover overlying at least part of the basin that is configured to allow water pumped from the basin to flow downwardly back toward the basin. The cover can be configured to provide pet drinking water access. For example, the cover can include a reservoir, which can be open to provide pet drinking access, as well as some form of a conduit, such as a channel which also can be open to provide pet drinking access. The pump is used to draw water from part of the basin and deliver it to the cover where it flows back down to the basin providing recirculation that helps keep the water fresh.

In the past, pet fountains have been complicated assemblies made of numerous parts that fit together much like putting together a jigsaw puzzle making them difficult to put together and stay together. Even worse, some of these fountains later have to be taken apart to refill the fountain or to change its filter. Over time, the time consumed and challenges of having to take apart and put together unnecessarily complicated fountains result in a high number of fountains being thrown in the corner.

In addition to being of complicated assembly, pump noise is also a problem. During operation, pump vibration transmitted to other parts of the fountain can produce noise audible to pets they find annoying. Just as bad, the pump noise in some fountains is even audible to humans, in some instances irritatingly so.

In addition to prior art fountains being equipped with pumps, many are also equipped with filters that filter the water in the fountain as it is being recirculated. Unfortunately, not only do filters need to be periodically changed, they also frequently plug up. Past fountains have located filters downstream of the discharge of the pump such that plugging of the filter will block circulation which can result in the fountain being rendered inoperable. Many filters are poorly located where they collect all debris entering the water leading to unnecessary plugging and requiring premature replacement. Often times, fountain users quit putting filters in their fountains as a result.

What is needed is a pet fountain of simple construction that is easy to assemble and stay together. What is also needed is an arrangement for a recirculating fountain equipped with a pump and filter that positions the filter in a manner that reduces plugging and optimizes filter life.

SUMMARY

The present invention is directed to a pet fountain assembly employing a fountain mounting arrangement that includes a pump coupled to one part of the fountain, such as a cover, using a lift tube and mounted to another part of the fountain, such as its lower basin, using a mount. In one preferred mounting arrangement, the pump is part of a pump module with the lift tube coupling the cover to the module and the mount attaching the module to the basin. When the cover is coupled to the module by the lift tube and the module is attached by the mount to the basin, the pump module, lift tube and mount serve as a mounting arrangement that is a cover mounting arrangement that anchors the cover to the basin.

The mount and lift tube are of vibration dampening construction that reduces pump noise during fountain operation. In a preferred embodiment, the mount is a module mount formed by a plurality of spaced apart suction cups made of a vibration dampening material, such as a resilient material that can be an elastomeric material, and the lift tube is also made of a vibration dampening material, such as a resilient material that also can be an elastomeric material. In addition to the suction cups providing vibration dampening, they also provide clearance preventing direct basin contact further helping to reduce noise. In addition to the cover-coupling lift tube providing vibration dampening, the lift tube also provides clearance preventing direct cover contact further helping to reduce noise.

The pump module includes a housing in which the pump is enclosed with the pump mounted in the module housing by another mount, a pump mount, which is also of vibration dampening construction. In one embodiment, the pump mount is formed of a plurality of spaced apart suction cups made of a vibration dampening material, such as a resilient material that can be an elastomeric material. When the module is mounted to the basin by the module mount, the pump mounted to the module by the pump mount, and the lift tube coupled to the cover, three levels of pump noise suppression are provided, reducing pump noise during fountain operation.

The pump module housing includes a discharge tube that registers in fluid flow communication with the lift tube and an outlet tube of the pump. The module housing includes a seat that locates the pump within the housing so the pump outlet tube registers with the module housing discharge tube, such as by one tube being telescoped in the other tube, in a manner where one tube can be generally coaxial with the other tube. In one embodiment, a vibration dampener is provided between the tubes, such as in the form of a ring or bushing made of dampening material, to further reduce pump noise.

In assembly, the pump module is attached by its module mount to the basin with its mount providing noise and vibration isolation between the pump module and basin reducing pump noise. The lift tube is attached to the fountain cover and attached to the pump module discharge tube such as by one tube being telescoped in the other tube thereby coupling the cover to the module and anchoring the cover to the basin.

The lift tube provides a fluid flow conduit for conveying water discharged from the pump to the cover where it can flow down into the basin. The lift tube includes a cover coupling end that has a cover seating groove formed in it that receives part of the cover surrounding an opening in the cover when assembled together. The lift tube includes a flange that can be annular that overlies part of the cover facing opposite the basin when the lift tube is assembled to the cover. The lift tube includes a module coupling end that is narrower than the cover coupling end enabling the module coupling end to be inserted into the cover opening in assembling the lift tube to the cover.

The module housing includes a cover that releasably attaches to a base. The base includes a downwardly facing intake that includes a plurality of intake vents that allow water in the basin to enter an intake chamber inside the module when drawn in by the pump. The base includes a filter seat configured to position a replaceable filter downstream of the intake and upstream of the pump with the seat also serving to divide the module into the intake chamber and a filtrate chamber. The base includes a pump seat that can be part of a pump intake well within the module that is part of the filtrate chamber or which is in fluid-flow communication with the filtrate chamber.

The part of the fountain to which the pump module is mounted can include a locator that serves as a target for mounting the module that can also locate the other part of the fountain that is coupled to the pump module by the lift tube when fountain assembly is completed. In a preferred embodiment, the basin has a pump module mounting locator that can be of recessed construction that locates the pump module when mounted in it therefore locating the cover relative to the basin when the cover is coupled by the lift tube to the pump module and the pump module mounted to the basin in the locator by the module mount.

Such a fountain assembly produces a fountain that is of quick and simple assembly that employs a pump module and lift tube in its cover mounting arrangement through which water from the basin is pumped by the pump in the module through the lift tube upwardly to the cover where the water can flow back into the basin in a recirculating manner.

DRAWING DESCRIPTION

One or more preferred exemplary embodiments of the invention are illustrated in the accompanying drawings in which like reference numerals represent like parts throughout and in which:

FIG. 5 is a perspective cross sectional view of the assembled fountain of FIG. 1;

FIG. 6 is a cross sectional elevation view of the assembled fountain of FIG. 1;

FIG. 8 is a partial fragmentary view illustrating another cover and basin embodiment depicting a cover and basin seating arrangement lacking interlocking engagement therebetween;

FIG. 9 is an enlarged cross section elevational view of the pump module;

Figure 1:
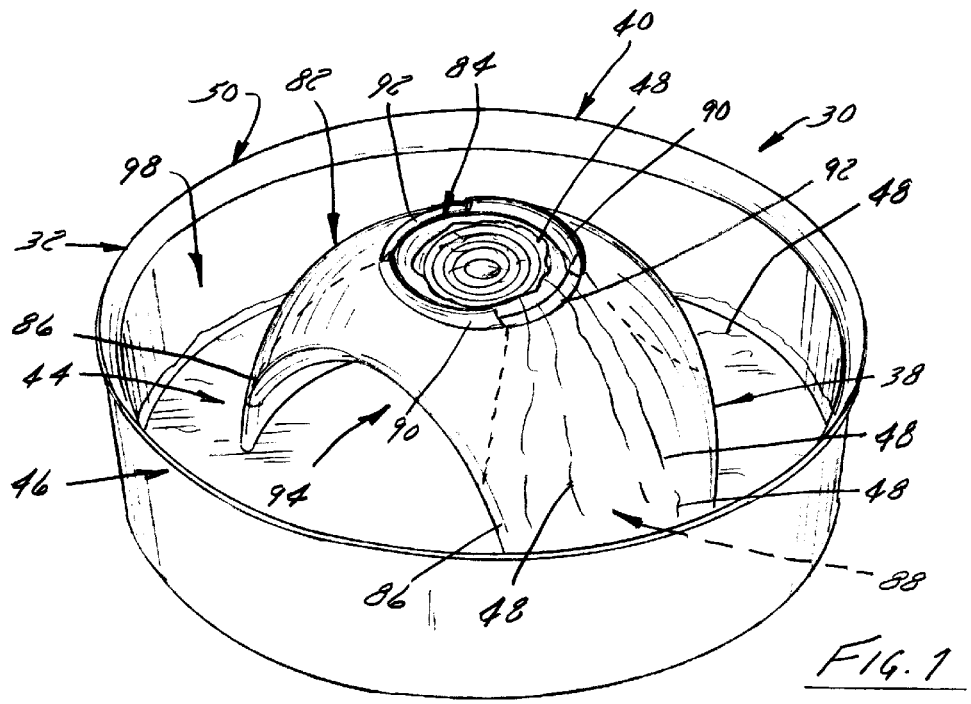
FIG. 1 is a top perspective view of an assembled pet fountain assembly constructed in accordance with the present invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 7:
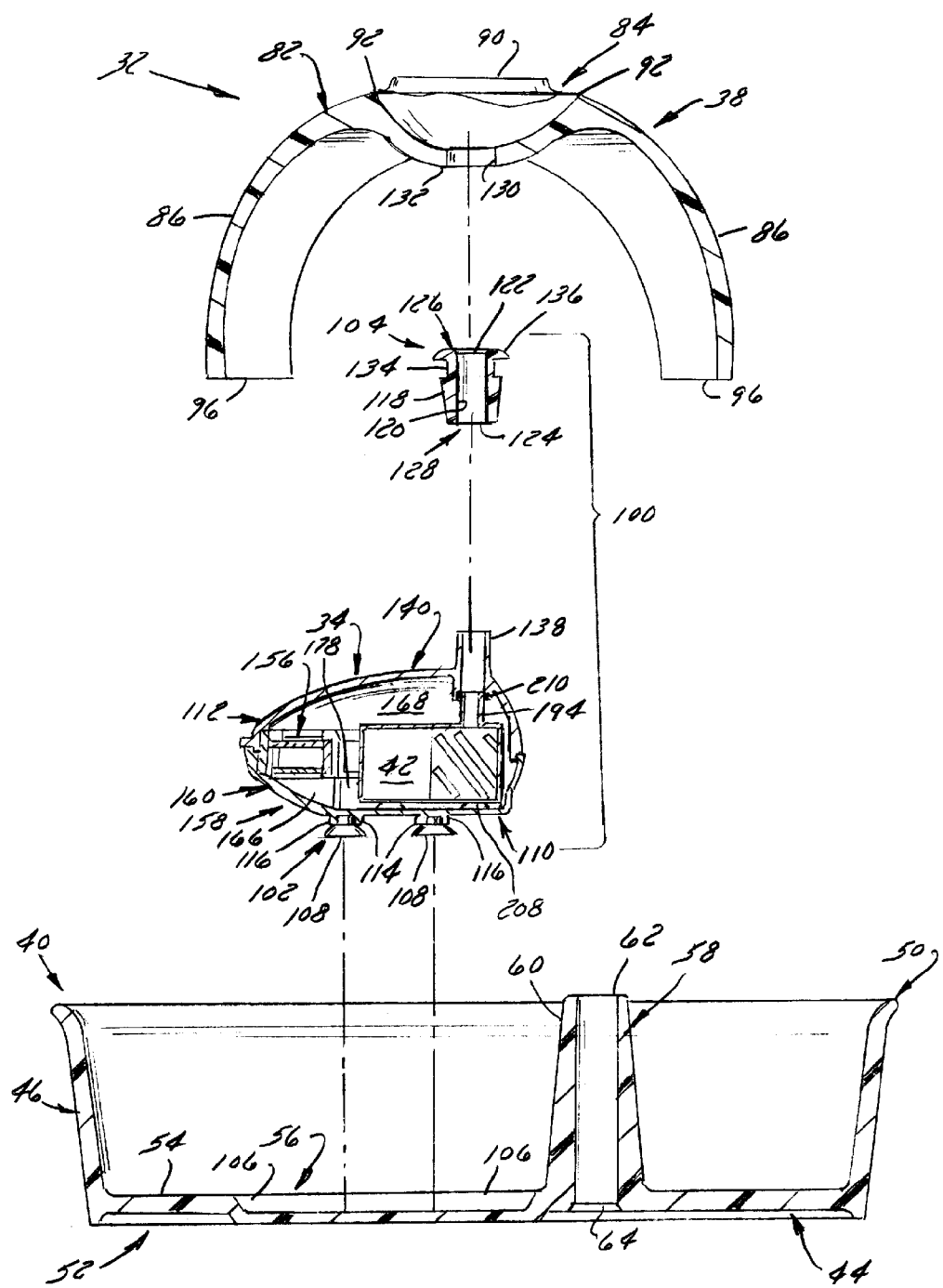
FIG. 7 is an exploded elevation view of the fountain assembly of FIG. 1 showing components of the assembly in cross section.

FIGS. 1-7 illustrate a preferred embodiment of a pet fountain 30 that includes a fountain assembly 32 constructed in accordance with the present invention that is of simple and easy to assemble construction which employs a pump module 34 to not only recirculate water during operation but which also is part of a mounting arrangement 100 shown in FIG. 7 that holds a fountain cover 38 in place relative to a fountain basin 40. A pump module 34 constructed in accordance with the present invention not only helps anchor the cover 38 in place, but is also of noise attenuating construction reducing pump noise during fountain operation.

Figure 3:
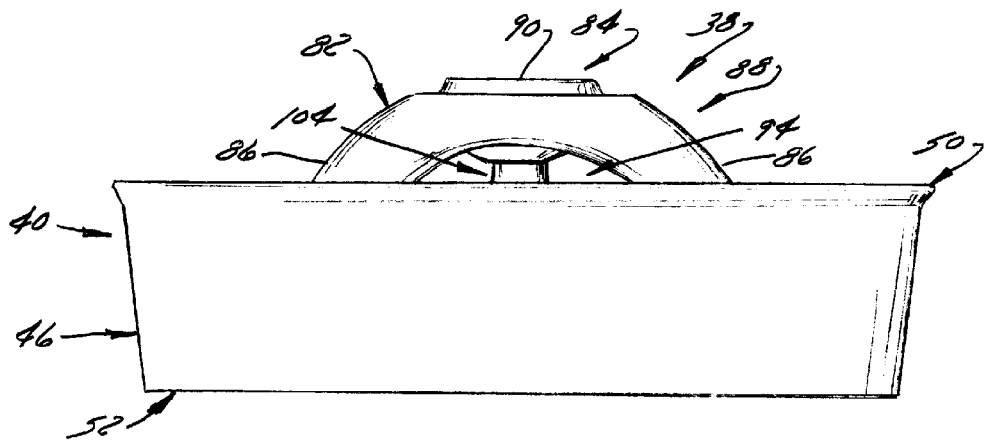
FIG. 3 is a side elevation view of the fountain of FIG. 1.

The fountain assembly 32 includes a fountain body formed by the cover 38 and basin 40 with the pump module 34 disposed between the cover 38 and basin 40 such that the module 34 may not necessarily be visible when the fountain 30 is assembled. The basin 40 has a bottom 44 and a sidewall 46 extending upwardly about the periphery of the bottom 44 enabling the basin 40 to hold water 48. Sidewall 46 has a top edge 50 that can be outwardly flared, such as shown in FIG. 3. As depicted in FIGS. 6 and 7 and discussed in more detail below, part of the basin, such as its sidewall, e.g., top edge, can be formed to provide a seat on which part of the cover can rest when the fountain is assembled.

The basin bottom 44 provides a base 52 enabling the fountain 30 to rest on a surface, such as the ground, a floor, a table, or the like. Basin bottom 44 has an interior surface 54 upon which part of the cover 38 can be supported, such as discussed in more detail below. The interior surface 54 includes a pump module locator 56, best shown in FIG. 4, which can be recessed as depicted in FIGS. 5 and 6, visually indicating the mounting position of the pump module 34 facilitating ease of assembly and disassembly.

Extending upwardly adjacent the locator 56 is a cord conduit 58 that has a tubular sidewall 60 with top and bottom openings 62, 64 (FIG. 6) through which an electrical power cord 66 extends. Cord conduit 58 has a height greater than the maximum height the basin 40 can be filled with water 48. As best shown in FIG. 6, cord conduit 58 has a height greater than that of the top edge 50 of the basin sidewall 46 to ensure water will overflow the sidewall 46 before entering the opening 62 in the conduit 58. As is also shown in FIG. 6, the conduit 58 underlies the fountain cover 38 with its top opening 62 spaced from the cover 38 to allow cord passage therebetween.

Figure 4:
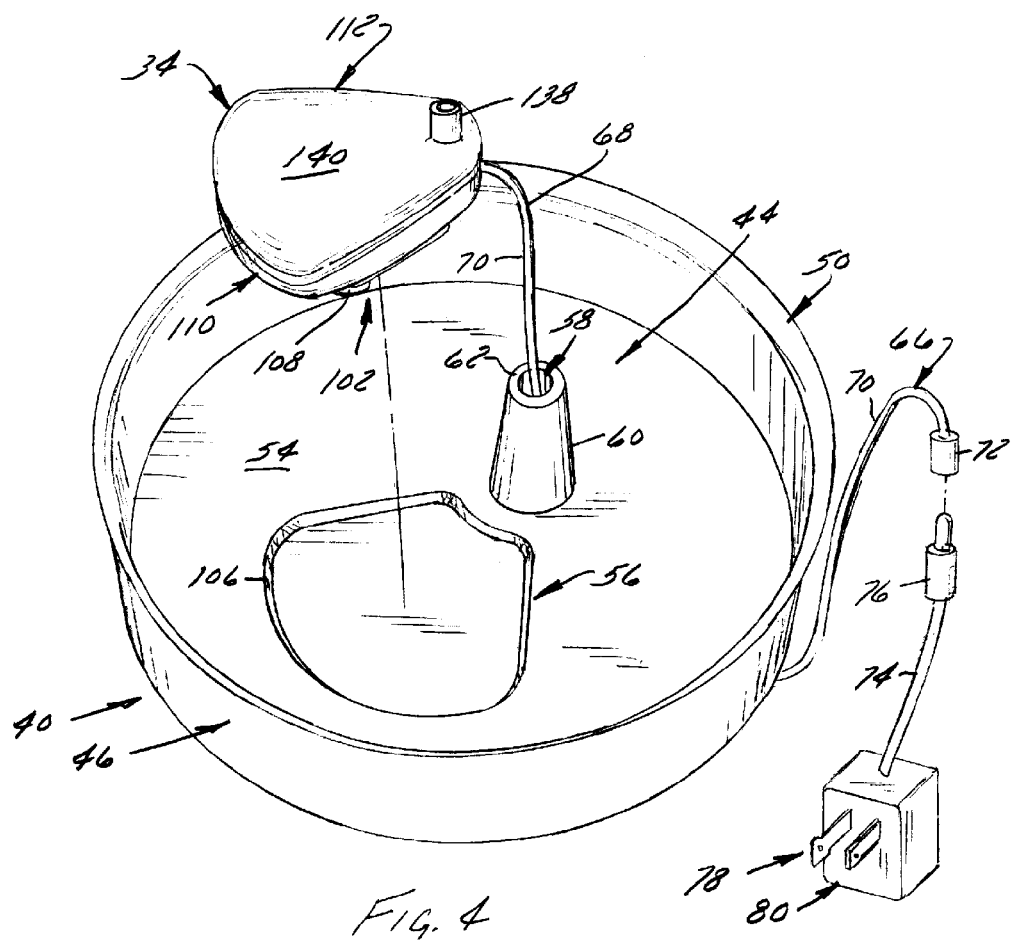
FIG. 4 is an exploded perspective view of the fountain of FIG. 1 with a cover of the fountain removed to depict a mounting location of a pump module in a basin of the fountain.

As is best shown in FIGS. 4-6, the pump module locator 56 is located adjacent the cord conduit 58 to minimize the length of the run 68 of the power cord 66 between the pump module 34 and conduit 58. To further minimize the length of cord run 68, the locator 56 is oriented to position a pump 42 of the pump module 34 proximal or close to the conduit 58.

With continued reference to FIG. 4, the power cord 66 has a first cord segment 70 extending from the pump 42 to a first electrical connector 72 having a width or diameter narrower than the narrowest portion of the inner diameter of the cord conduit 58 enabling the first connector 72 to be inserted into and passed through the entire length of the conduit 58, including through both conduit openings 62, 64, during assembly. The power cord 66 has a second cord segment 74 with a second electrical connector 76 at one end and a plug 78 at its other end that is plugged into a source of electricity, such as a source of alternating current having a voltage greater than 110 volts. One of the first and second connectors is a female connector 72 and the other one of the first and second connectors is a male connector 76 that releasably couples with the female connector 72 providing an electrically conductive coupling when connected. Plug 78 is part of a step-down transformer 80 that reduces the source voltage by at least a plurality of pairs of times, i.e., at least three times, to a voltage of no greater than twenty percent of the source voltage.

For example, in one preferred embodiment, the transformer 80 steps down a source voltage of between 110 volts and 240 volts AC to a voltage of between about 5 volts and 12 volts that is supplied to the pump 42. The use of such a multi-segmented power cord 66 with separate cord segments 70, 74 connectable using connectors 72, 76 advantageously enables a lower voltage submersible pump 42 to be used in the pump module 34 that requires a step-down transformer 80 ordinarily too large in size to be passed through the cord conduit 58 and that needs to be located away from water outside the fountain 30.

The top of the fountain cover 38 has a dome 82 in which an open bowl 84 is formed allowing a pet, such as a cat, to drink water 48 in the bowl 84 pumped from the basin 40. The dome 82 is supported by a plurality of legs 86 that can be outwardly bowed or curved that also provides a spillway 88 (depicted in phantom) down which water from the bowl 84 can flow during fountain operation. Each spillway 88 is also pet accessible, allowing a pet to drink water 48 as it flows down each leg 86. The bowl 84 includes a plurality of upraised lips 90 that are located and spaced apart to define openings 92 therebetween that direct water 48 overflowing from the bowl 84 so it flows down a corresponding spillway 88 of each leg 86.

The legs 86 of the cover 38 are spaced apart with the space 94 between adjacent legs 86 allowing recirculating water 48 flowing down legs 86 into the basin 40 to return to the pump module 34 where it can be pumped back up to bowl 84. As is best shown in FIGS. 5 and 6, each leg 86 has a foot 96 at its bottom that rests on part of the interior surface 54 of the basin bottom 44 when the fountain 30 is assembled. As is also shown in FIGS. 5 and 6, the bottom of each foot 96 is generally flat and rests on a generally flat portion of the basin bottom interior surface 54 when the cover 38 is assembled.

The fountain cover 38 is configured to allow pet drinking access to water 48 in the basin 40 when the cover 38 is assembled. The legs 86 of the cover 38 are spaced from the basin sidewall 46 providing an open basin area 98 between the cover 38 and basin sidewall 46 that is accessible to a pet. The open space 94 between adjacent legs 86 provides additional pet drinking access to water 48 in the basin 40.

FIGS. 5-7 illustrate a fountain cover mounting arrangement 100 employing the pump module 34 to anchor the fountain cover 38 in place when the cover 38 is attached to the module 34 and the module 34 is mounted to the basin 40. The cover mounting arrangement 100 includes a module mount 102 used to mount the pump module 34 to the basin 40 and a coupling 104 used to attach the cover 38 to the module 34 that also serves as a water-transporting lift tube. By mounting the pump module 34 to the basin 40 within an outer boundary 106 of the pump module locator 56 as depicted in FIGS. 4-7, the cover mounting arrangement 100 also locates the cover 38 relative to the basin 40 when the cover 38 is mounted to the basin 40 via cover mounting arrangement 100. Locator 56 can be recessed as depicted in FIGS. 4-7 along boundary 106 such as to provide a recessed well or sump in the basin 40 that facilitates water return to the pump module 34 where it can be more easily drawn into the module 34 during pump operation.

The module mount 102 and the cover-coupling lift tube 104 each function as dampeners or vibration isolators that reduce pump noise resulting in quieter fountain operation. The module mount 102 is of vibration dampening construction to reduce transmission of pump noise and vibration from the pump module 34 to the basin 40 and the lift tube 104 is also of vibration dampening construction to reduce transmission of pump noise and vibration from the pump module 34 to the cover 38. The module mount 102 and lift tube 104 are made of a vibration dampening material, such as a resilient material that can be of elastomeric construction.

With reference to FIGS. 6-7 and 9-11, the module mount 102 is formed of a plurality of spaced apart suction cups 108 that extend outwardly from a bottom 110, e.g., base, of a pump module housing 112 used to releasably mount the pump module 34 in the basin 40 while spacing the housing 112 from the basin 40 keeping them from direct contact. As best shown in FIGS. 6-8, the suction cups 108 space the housing bottom 110 from the basin 40 such that no part of the housing 112 comes in direct contact with the basin 40 thereby preventing direct noise and vibration transmission from the pump module 34 to the basin 40.

Figure 11:
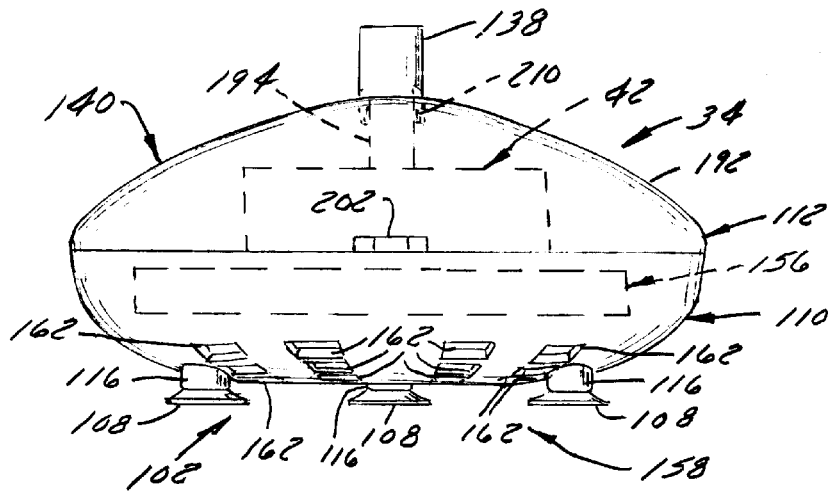
FIG. 11 is a front elevation view of the pump module in a closed condition illustrating a filter and pump in phantom enclosed within the module housing.
Figure 10:
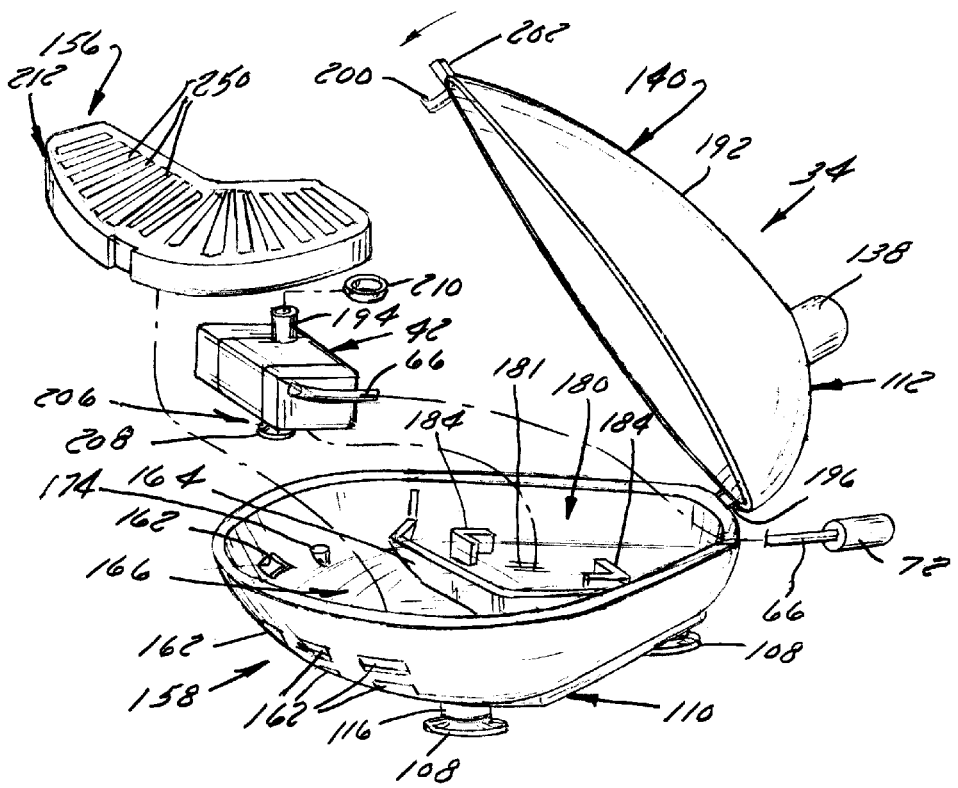
FIG. 10 is a partially exploded view of the pump module showing a housing of the module in an opened condition.

As best shown in FIGS. 10 and 11, the module mount 102 is formed of a plurality of pairs of spaced apart suction cups 108 arranged in a triangular pattern with each cup 108 having a stem 114 (FIG. 9) received in a socket 116 extending outwardly from the module housing bottom 110. Each suction cup 108 is made of a material that also advantageously enables it to function as a dampener or vibration isolator. By spacing the pump module housing 112 above the basin 40 preventing direct contact therebetween, direct noise and vibration transmission is prevented. By making each suction cup 108 of a vibration dampening or isolating material, pump module noise and vibration is attenuated or reduced. As a result, fountain operation is quieter.

Each suction cup 108 is made of a resilient and flexible material, such as an elastomeric material, which not only provides a resilient mount but which also enables the cup 108 to function as a dampener or vibration isolator. Examples of suitable suction cup materials include polyvinyl chloride, neoprene, perbunan, polyurethane, vulkollan, silicone, and viton. Other materials are also contemplated as being suitable, such as natural rubber, silicone rubber and Buna S.

As previously discussed, the cover-coupling lift tube 104 is not only used to attach the fountain cover 38 to the pump module 34, it also serves a lift tube through which water 48 pumped from the basin 40 is transported upwardly to the bowl 84 in the cover 38. As best shown in FIGS. 5-7, the lift tube 104 is defined by an endless sidewall 118 that defines a fluid transporting conduit 120 that has openings 122, 124 at opposite tube ends 126, 128. The tube 104 tapers from a larger diameter cover coupling end 126 to a smaller diameter pump module coupling end 128 enabling the tube 104 to be attached to the cover 38 by inserting the narrower end 128 first into an opening 130 in the bowl 84 until the wider end 126 engages and couples with part 132 of the bowl 84 encircling and defining bowl opening 130.

The cover coupling end 126 of the lift tube 104 has a cover receiving groove 134 defined on one side by an annular retainer flange 136 that abuts against the part 132 of the bowl 84 that encircles the bowl opening 130 when cover or bowl part 132 is seated in groove 134 coupling the tube 104 to the cover 38 in a manner that prevents tube disengagement or decoupling. When the tube 104 is attached to the cover 38, such as in the manner depicted in FIGS. 5 and 6, its retainer flange 136 also functions as a watertight sealing grommet that prevents water 48 in the bowl 84 from leaking from opening 130.

The pump module coupling end 128 of the lift tube 104 is configured so its intake opening 124 telescopically receives a discharge tube 138 integrally formed in a top or cover 140 of the pump module housing 112, which serves as a coupling nipple for releasably coupling with the lift tube 104. The inner diameter of the lift tube conduit 120 at and adjacent the intake opening 124 is sized relative to the outer diameter of the pump module discharge tube 138 to provide frictional engagement, e.g., a friction fit, between the tubes 104, 138 coupling them together when the pump module coupling end 128 of the lift tube 104 is telescoped over the pump module discharge tube 138.

The lift tube 104 is also made of a resilient material, such as a flexible, resilient elastomeric material, which enables it to function as a dampener or vibration isolator when coupling the fountain cover 38 to the pump module 34. Examples of suitable lift tube materials include polyvinyl chloride or neoprene. Other suitable materials include perbunan, polyurethane, vulkollan, silicone, and viton. By making the cover-coupling lift tube 104 of a vibration dampening or isolating material, pump module noise and vibration is attenuated or reduced. As a result, fountain operation is quieter.

In assembly, the pump module 34 is mounted by its suction cups 108 to the fountain basin 40 so the module 34 overlies the pump module locator 56 such as by positioning it so at least its suction cups 108 are disposed within the locator boundary 106. The connector 72 of the segment 70 of the power cord 66 connected to the pump 42 in the pump module 34 is inserted through the cord conduit 58 where it can be connected to connector 76 located outside the basin 40. The lift tube 104 is attached to the fountain cover 38 before being attached to the pump module discharge tube 138, which locates the cover 38 relative to the basin 40 completing fountain assembly. To disassemble, the cover 38 can be pulled away from the basin 40 until either the tube 104 disengages from the pump module 34 or the suction cups 108 disengage from the basin 40. By reducing the number of fountain components and subassemblies that need to be assembled to put the fountain 30 together to just four, namely the cover 38, lift tube 104, pump module 34 and basin 40, fountain assembly and disassembly is advantageously simplified, quicker to do, and easier.

When assembled, such as depicted in FIGS. 5 and 6, the suction cups 108 keep the pump module 34 attached to the basin 40 and the lift tube 104 keeps the cover 38 attached to the module 34 thereby holding the cover 38 in place relative to the basin 40 keeping the fountain assembled. The dampening or vibration isolating construction of the cover-coupling lift tube 104 used to couple the cover 38 to the module 34 reduces pump noise thereby quieting fountain operation. The dampening or vibration isolating construction of the suction cups 108 used to mount the module 34 to the basin 40 also reduces pump noise thereby also quieting fountain operation.

The cover mounting arrangement 100 therefore holds the fountain cover 38 in place once fountain assembly is completed. The cover mounting arrangement 100 not only holds the cover 38 in place, it does so without requiring any interlocking engagement between the cover 38 and basin 40. For example, as is shown in FIGS. 5 and 6, the legs 86 of the cover 38 abuts against the basin 40 without either the legs 86 or the basin 40 configured to provide interlocking engagement therebetween.

With additional reference to FIG. 8, although the fountain cover 38 is shown in FIG. 6 with its legs 86 resting on the interior surface 54 of the bottom 44 of the basin 40, the fountain cover 38 can be constructed differently such as with one or more portions 142, 144 (shown in phantom in FIG. 6), instead of or in addition to one, more or all of the legs 86, which have an outer or bottom surface 146 received in a seat 148 formed in part of the basin sidewall 46, such as in its top edge 50'. For example, as shown in FIG. 8, seat 148 can be configured with an abutment surface 150 against which a complementarily configured cover surface 146 abuts and a retainer lip 152 that bounds a complementarily configured outer surface 154 of the cover 38'. Of course, other seating and abutment configurations lacking interlocking engagement are contemplated that permits the cover 38 to be assembled and held in place via cover mounting arrangement 100 without departing from the scope of the present invention.

FIGS. 9-11 illustrate the pump module 34 in more detail including the pump 42 and a filter 156 inside a housing 112 of the module 34. FIGS. 12-17 illustrate the pump module housing 112 in more detail. FIGS. 18-21 illustrate components of a housing 212 of the filter 156. The module 34 holds the pump 42 within it and provides a fountain cover mounting arrangement 100 with the lift tube 104 that anchors the fountain cover 38 in place when fountain assembly is completed that also advantageously provides pump noise suppression as discussed above. In the preferred embodiment of the module 34 shown in the drawing figures, the module 34 includes a replaceable filter 156 used to filter water 48 entering the module 34 before being pumped by the pump 42 through the lift tube 104 up to the cover 38 where it can then flow down back into the basin 40 in a recirculating manner. The module housing 112 is formed by a bottom half 110, or base, that removably engages with a top half 140 that functions as a module cover in a manner that enables the pump module 34 to be easily and quickly opened, such as to remove and replace the filter 156 or the like, or even taken apart, such as for washing the components of the module 34. The module housing halves 110, 140 are made of a durable material, such as a plastic or the like, which preferably is dishwasher-safe to facilitate ease of cleaning.

The bottom half 110 of the pump module housing 112 is configured with a water intake vent grate 158 formed in a downwardly facing surface 160 that is disposed adjacent the basin bottom 44 so that at least some and preferably all of its intake vents 162 remain submerged in the water 48 in the basin 40 during fountain operation. This minimizes the amount of larger debris and other larger particulate matter that typically falls into the water 48 over time that can get drawn into the intake vents 162 during pump operation. This prevents pump module plugging while also reducing the amount of larger debris that ends up getting trapped against the filter 156, keeping a larger filtering surface area unobstructed that increases filter efficiency while also advantageously extending filter life. This produces a pump module 34 constructed in accordance with the present invention that locates the filter 156 above the basin bottom-facing intake vents 162 disposed close to the bottom 44 of the basin 40 and upstream of the pump 42 advantageously reducing plugging while improving filter operation and increasing filter life.

Figure 12:
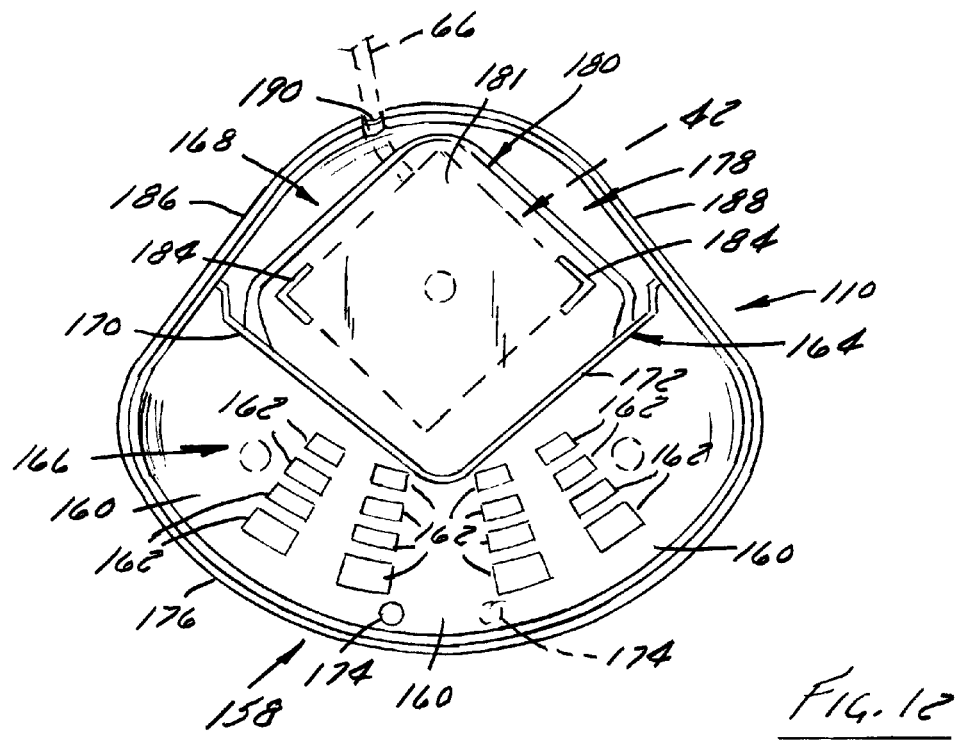
FIG. 12 is a top plan view of a base of the pump module housing.
Figure 13:
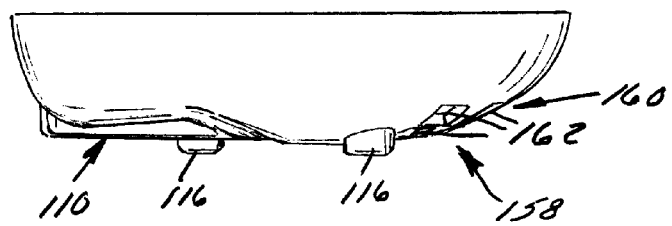
FIG. 13 is a side elevation view of the module base.
Figure 14:
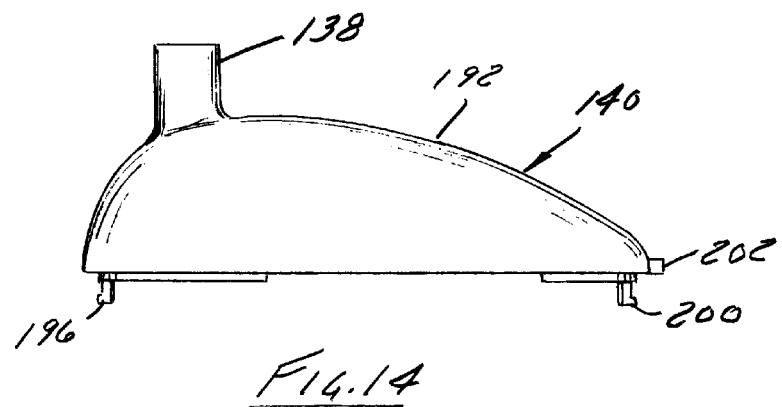
FIG. 14 is a side elevation view of a cover of the pump module housing.
Figure 15:
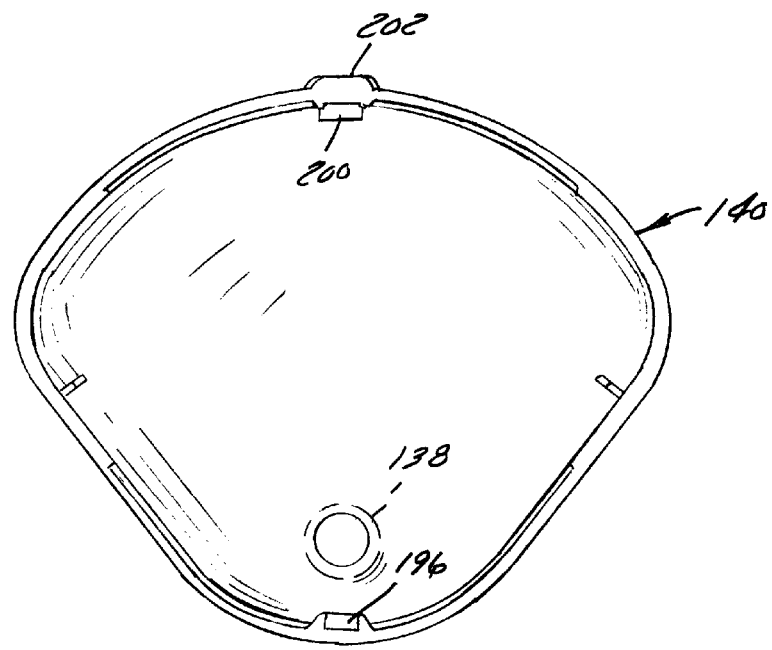
FIG. 15 is bottom plan view of the module cover.
Figure 16:
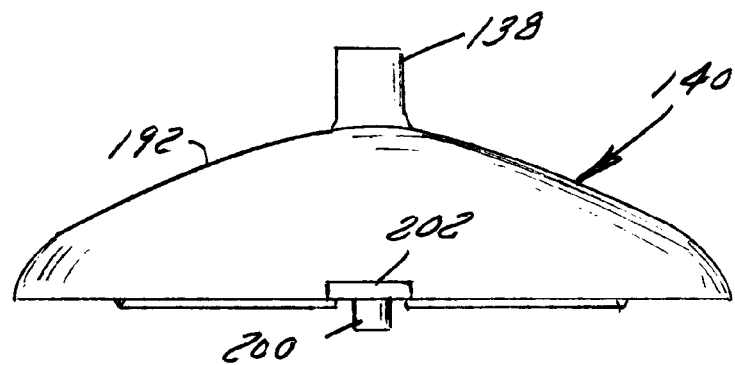
FIG. 16 is a front elevation view of the module cover.
Figure 17:
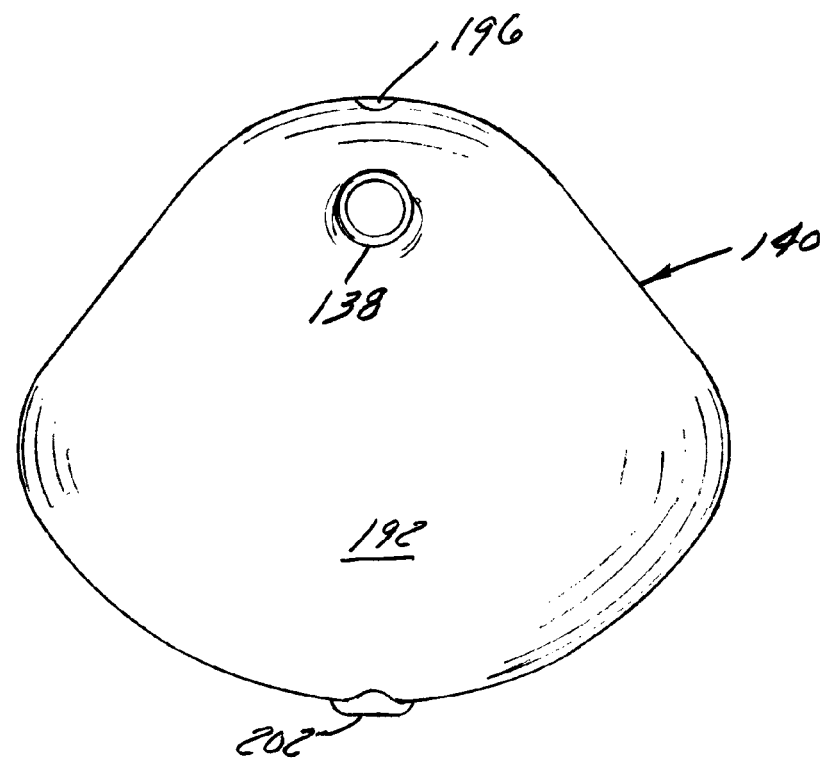
FIG. 17 is a top plan view of the module cover.

The module housing bottom 110 is of concave construction having a plurality of columns of intake vents 162 spaced laterally apart across substantially the entire bottom-facing intake vent surface 160 with each intake vent column having a plurality of spaced apart vents 162 positioned at different heights above the basin bottom 44 that increase in size the farther the vent is spaced from the bottom 44. The bottom-facing intake vent surface 160 is inclined or curved relative to the basin bottom 44 so as to position different intake vents 162 of each intake vent column at different depths in the water 48 so as to ensure at least some vents 162 remain open if others become plugged. In addition, positioning different vents 162 so they are at different depths also helps ensure at least some vents will remain submerged should the level of water 48 in the basin 40 significantly drop. As is best shown in FIGS. 12 and 13, the vents 162 in each column have different sizes with vent size decreasing closer to the basin bottom 44 helping to ensure debris passes through the larger vents before it can reach the smaller vents closer to the basin bottom 44 helping to ensure at least some vents, namely the vents 162 closest to the basin bottom 44, will always remain unobstructed or unplugged.

With reference to FIGS. 9-11 and 12, the module housing bottom 110 has an interior filter-supporting wall 164 that divides the module 34 into an intake chamber 166 through which water 48 from the basin 40 enters the module 34 through the vents 162 and a filtrate chamber 168 where filtered water within the module flows after it has passed through the filter 156. The filter-supporting wall 164 has a pair of wall segments 170, 172 that converge to generally form a right angle generally complementarily to a corresponding corner of a block-shaped or cube-shaped pump 42 having generally rectangular, e.g., square, sides received in the bottom 110.

The filter-supporting wall 164 supports the filter 156 on it along one side or edge of the filter 156 in a manner that helps provide a seat for the filter 156 and which can also provide a seal therebetween that helps oppose water 48 entering the intake chamber 166 from flowing around the filter 156 during pump operation. When inserted in the module housing bottom 110, an opposite side or edge of the filter 156 is supported on one or more upraised filter support posts 174 (FIG. 12) disposed inside the intake chamber 166 adjacent part, e.g., a front part, of an outer edge 176 of the housing bottom 110 opposite the pump 42.

With continued reference to FIGS. 9-11 and 12, the module housing bottom 110 also includes a pump intake well 178 disposed in the filtrate chamber 168 that includes a pump seat 180 defined by a generally flat pump-supporting surface 181 from which a pair of pump-locating seating brackets 184 extend upwardly. The brackets 184 engage opposite corners of a pump 42, shown in phantom in FIG. 12, mounted in the seat 180 locating the pump 42 and spacing water intake inlets 182 in a housing 183 of the pump 42 away from an adjacent side 186, 188 of the housing bottom 110 to enable water 48 to enter the pump 42 after it has passed through the filter 156. The brackets 184 also locate the pump 42 so its power cord 66 is located adjacent a cord notch 190 formed in another part of the outer housing edge 176 so it can be seated in the notch 190 when assembling the pump 42 in the module 34.

FIGS. 9-11 and 14-17 illustrate the top half 140 of the pump module housing 112, which functions as a releasable or removable cover of the pump module 34. The top half 140 has an upper surface 192 that can be curved as shown such as to provide a smooth contoured outer surface that is aesthetically pleasing and which can minimize flow resistance. The top housing half 140 includes the pump module discharge tube 138 that is integrally formed and located so it overlies the pump seat 180 in the module housing bottom half 110 such that an outwardly extending outlet tube 194 of the pump 42 registers with the discharge tube 138 of the pump module 34 to convey water discharged from the pump 42 into the lift tube 104. In a preferred embodiment, at least a portion of the pump outlet tube 194 is telescopically received in the pump module discharge tube 138 when the housing halves 110, 140 are assembled together, e.g., with the top half 140 closed and in engagement with the bottom half 110 as depicted in FIG. 9. In one embodiment, the pump outlet tube 194 is generally coaxial with the pump module discharge tube 138 when the pump 42 is mounted in the pump seat 180 in the bottom housing half 110 and the top half 140 closed over the bottom half 110.

To enable the module housing top half 140, e.g., cover, to be engaged with the bottom half 110, e.g., base, in a closed position, the top half 140 includes a hinge tab 196 disposed adjacent the pump module discharge tube 138 that is pivotably received in a recess 198 formed in the bottom half 110 in the manner depicted in FIG. 9. The top half 140 also includes a latching tab 200 opposite the hinge tab 196 that is disposed below a latch-actuating flange 202 that is manually urged toward the filter 156 to open the pump module 34 by causing the latching tab 200 to disengage from a latching pocket 204 formed in the bottom half 110.

When the pump module housing halves 110, 140 are releasably latched in the closed position shown in FIG. 9, the filter 156 and pump 42 are releasably captured within the pump module 34. As a result, at least some of the noise of the pump 42 is attenuated by being enclosed within the module housing 112. In addition, the pump 42 includes a pump mounting arrangement 206 shown in FIG. 10 that further attenuates noise and vibration because it is of vibration damping or vibration isolating construction.

Pump mounting arrangement 206 includes a plurality of spaced apart suction cups 208 made of a resilient material that provides noise and vibration dampening or isolation by isolating the pump 42 from being in direct contact with the bottom housing half 110. Pump-mounting suction cups 208 can be made of a material like that or same as that of module-mounting suction cups 108. The suction cups 208 releasably mount the pump 42 to the flat mounting surface 181 of the pump seat 180 formed in the module housing bottom half 110 spacing the bottom of the pump 42 at least slightly away from the pump mounting surface 181. If additional vibration isolation is desired, a ring or cylindrical bushing 210 made of a noise and vibration dampening or isolating material can be disposed between the pump outlet tube 194 and the pump module discharge tube 138, such as depicted in FIGS. 9-11.

Ring or cylindrical bushing 210 can help couple the tubes 138, 194. Ring or bushing 210 can be made of a resilient material of elastomeric construction same as or like that used for suction cups 108 and 208 and/or lift tube 104. Such a construction can provide noise and vibration dampening between the pump 42 and the module housing bottom 110, between the pump outlet tube 194 and the module housing cover 140, or between the pump 42 and both halves 110, 140 of the pump module 34 where both the resilient vibration dampening/isolating pump mounts 208 and the resilient vibration dampener or isolator 210 are employed.

FIGS. 9-11 illustrate the filter 156 disposed inside the pump module 34 with the filter 156 held releasably captive between the module housing halves 110, 140 when the module cover 140 is closed and engaged with the module base 110. The filter housing 212 is of two-piece, snap together construction having a perforated cap 214 that snaps onto a perforated body 216. The filter housing components 214, 216 are made of a material, such as a plastic, which provides suitable support to filter media received within the housing 212 when the components 214, 216 are assembled together.

As is best shown in FIG. 9, the filter 156 houses filter media 218 that can be of multilayer or multistage construction. For example, the filter media 218 shown in the filter 156 illustrated in FIG. 9 includes a pair of spaced apart fibrous filter media layers 220, 222 that can be made of matted or compressed fibrous material that sandwiches an adsorption filter media layer 224 in between. One or both media layers 220, 222 can be of another construction, such as, e.g., a filter screen or filter membrane, if desired. Adsorption filter media layer 224 preferably is made of an activated adsorption material, such as activated charcoal or the like.

Figure 19:
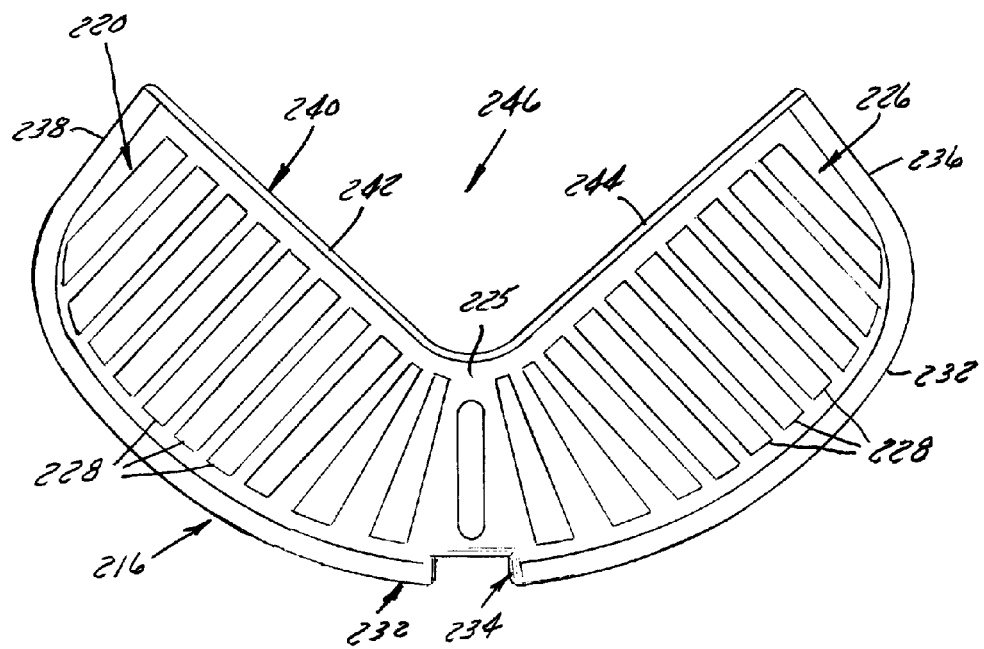
FIG. 19 is a top plan view of the filter housing base.
Figure 18:
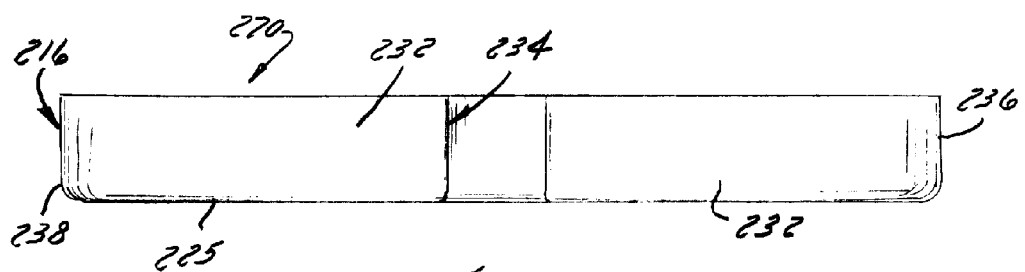
FIG. 18 is a front elevation view of a filter housing base.

Various views of the snap-together components 214, 216 that form the filter housing 212 are shown in FIGS. 18-21. FIGS. 18 and 19 illustrate the filter housing body 216 that defines an enclosure 217 in which filter media 218 is received. The body 216 has a generally planar outer wall 225 with an outer surface 226 that is of perforated construction having a plurality of pairs, i.e., at least three, of spaced apart elongate slots 228 through which water flows during filter operation. To optimize flow through the filter 156, substantially the entire outer surface 226 is perforated with slots 228 forming a filter flow slot array 230 extending from side-to-side with slots 228 extending front-to-back.

With continued reference to FIGS. 18 and 19, the body 216 has a generally curved front wall 232 that is curved to match the contour of a corresponding curved portion of the module housing bottom 110 adjacent edge 176 so as to enable contact therewith. The curved front wall 232 is interrupted by a generally centrally located notch or channel 234 that provides clearance for the latching tab 200 of the pump module housing cover 140 when the filter 156 is seated in the pump module 34. The notch or channel 234 can also help locate and maintain the position of the filter 156 over the intake chamber 166 in the module 34 when the module housing cover 140 is closed. The curved front wall 232 of the filter housing 212 transitions into a pair of spaced apart sidewalls 236, 238 that extend to a generally V-shaped rear wall 240 shown in FIG. 19 having a pair of sidewall segments 242, 244, which converge to form a generally right-angled recess 246 that generally matches the outer contour of the box-like or cube-shaped pump 42. The generally V-shaped rear wall 240 has a shape generally complementary with the module housing divider wall 164 so as to overlie and/or seat on the wall 164 when the filter 156 is inserted in the pump module 34.

Figure 20:
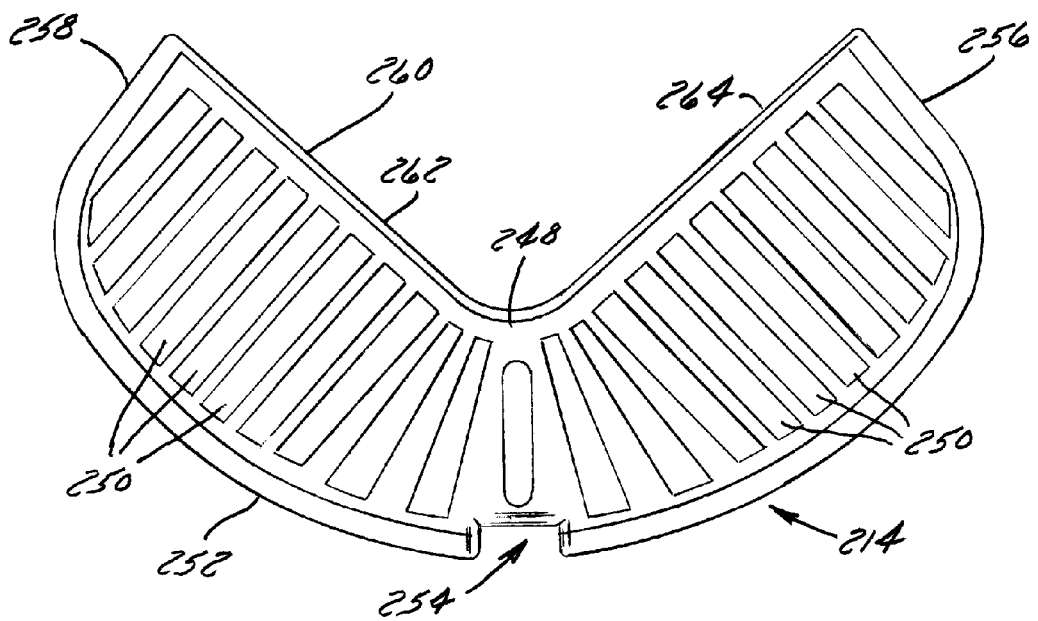
FIG. 20 is a top plan view of a filter housing cap.
Figure 21:
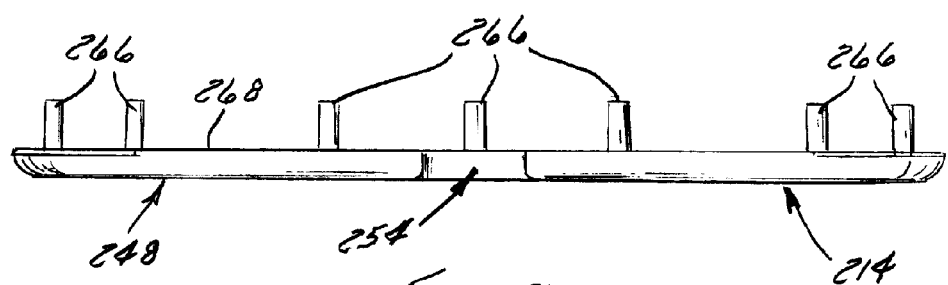
FIG. 21 is a front elevation view of the filter housing cap.

FIGS. 20 and 21 illustrate the filter housing cap 214 in more detail. The cap 214 includes a generally planar perforate outer wall 248 having filter flow slots 250 arranged in an array or pattern that is substantially the same as the perforate outer wall 225 of the filter housing body 216. The cap 214 has a curved forward edge 252 having a curved shape or contour that is substantially the same as that of the curved front wall 232 of the filter housing body 216. The curved forward edge 252 also includes a notch 254 that aligns with the channel 234 in the filter housing body front wall 232 when the cap 214 is attached to the body 216. The cap 214 also includes a pair of side edges 256, 258 that align with sidewalls 236, 238 of the filter housing body 216 when the cap 214 is attached to the body 216. The cap 214 also includes a generally V-shaped rear sidewall 260 with wall segments 262, 264 that converge at a general right angle which align with corresponding sidewall segments 242, 244 of the V-shaped rear wall 240 of the filter housing body 216 when the cap 214 is attached to the body 216.

With reference to FIGS. 9 and 21, the filter housing cap 214 includes at least a plurality of pairs of spaced apart integrally formed bosses 266 extending outwardly from an inner surface 268 of perforate wall 248 that are each received in a corresponding boss receptacle 270 (FIG. 9) integrally formed in and along the sidewalls 232, 236, 238 and 240 of the filter housing body 216 in attaching the cap 214 to the body 216 in assembling the filter 156. Each boss receptacle 270 is interiorly disposed and includes a bore configured with an inner diameter that provides a friction fit with a corresponding one of the bosses 266 when inserted into the receptacle 270 during filter assembly.

The sidewalls 232, 236, 238 and 240 of the filter housing body 216 along with its perforated outer wall 225 define a recess or cup 270 in which filter media 218 is placed during filter assembly. The filter housing cap 214 is then snapped onto the body 216 by inserting its bosses 266 into a corresponding one of the boss receptacles 270 until at least the outer edges of sidewalls 252, 254, 256, and 260 of the cap 214 respectively abut against mating surfaces or outer edges of the sidewalls 232, 236, 238 and 240 of the body 216.

Such a filter construction advantageously produces a relatively compact filter 156 having a self-locating shape that easily seats on the filter support post(s) 174 and divider wall 164 in the module housing bottom 110 during assembly so that the filter 156 overlies the intake chamber 166 with its filter slots 228, 250 positioned above the intake vents 162 formed in the bottom-facing surface 160 of the module housing bottom 110. Its L-shape with its V-shaped rear walls 240, 260 accommodates the block or cubic shape of the pump 42 while maintaining sufficient clearance from the pump 42 to allow filtered water exiting the filter 156 to flow downwardly into the intake well 178 formed in the module housing bottom 110 in which the pump 42 is disposed. This also helps produce a pump module 34 of simple and compact construction that is easy to take apart and put back together such as to clean components of the module 34 and replace the filter 156.

With reference once again to FIGS. 1, 2, 5, 6 and 9, during fountain operation, water 48 in the basin 40 is drawn through pump module intake vents 162, such as in the manner depicted by the flow arrows in FIG. 9, into the intake chamber 166 inside the pump module 34 due to suction created by operation of the pump 42 inside the module 34. The water 48 in the intake chamber 166 flows upwardly through one set of slots, e.g., slots 228, 250, in the filter housing 212, through filter media 218, and out the other set of slots, e.g., 250, 228 exiting the filter 156 and entering the filtrate chamber 168. Filtered water in the filtrate chamber 168 is drawn into the pump intake well 178 where it flows into the pump 42 through inlets 182 in the pump housing 183.

The pump 42 discharges the water from of its outlet 194 into the pump discharge tube 138 of the module 34 where it is conveyed through the lift tube 104 upwardly to the fountain cover 38. Where the cover 38 is equipped with a pet drinking bowl, such as bowl 84, water from the lift tube 104 fills the bowl 84 until it overflows onto one of the spillways 88 of one of the fountain cover legs 86. Overflowing water flows down one or more of the spillways 88 back into the basin 40 where it is returned to the pump module 34 enabling the water 48 to continuously circulate during pump operation. Where the fountain includes a fountain cover equipped with a channel, such as a recessed U-shaped or crescent shaped channel, water discharged from the lift tube 104 can flow down one or more such channels back into the basin.

When it is desired to service, clean, or otherwise maintain the fountain 30, the fountain assembly 32 can be easily disassembled by pulling the cover 38 away from the basin 40 until either the suction cups 108 of the pump module 34 disengage from the basin 40 or the lift tube 104 detaches from the pump module discharge tube 138. Depending upon what needs to be done, additional disassembly can be performed. For example, where it is desired to replace the filter 156, the latch-actuating flange 202 of the pump module housing cover 140 can be pressed to disengage the latch 200 from the latch receptacle 204 in the module housing base 110 allowing the cover 140 to be pivoted about the hinge tab 196 to an open position, such as is depicted in FIG. 10, permitting filter access. Filter 156 can be removed and replaced with a new filter 156, if desired. Otherwise, the base 110 and cover 140 can be separated and cleaned, such as by washing them in a dishwasher. When it is desired to reassemble the pump module 34, its cover 140 can be closed causing latch 200 to releasably engage the latch receptacle 204 of the base 110 to keep the cover 140 closed.

Thereafter, the pump module 34 is mounted by its suction cups 108 in the module locator area 106 of the basin 40. If needed, segment 70 of the power cord 66 is routed through the cord conduit 58 in the basin 40 by inserting its connector 72 into the conduit 58 and passing it through the conduit 58. If needed, the lift tube 104 can be inserted through the opening 130 in the cover 38 until the part 132 of the cover 38 that surrounds and defines the opening 130 is seated in the groove 134 in the tube 104 coupling the tube 104 to the cover 38 before attaching the tube 104 to the module 34. The cover 38 is maneuvered to couple the lift tube 104 with the module 34 by telescoping the lift tube 104 over the pump module discharge tube 138.

Figure 2:
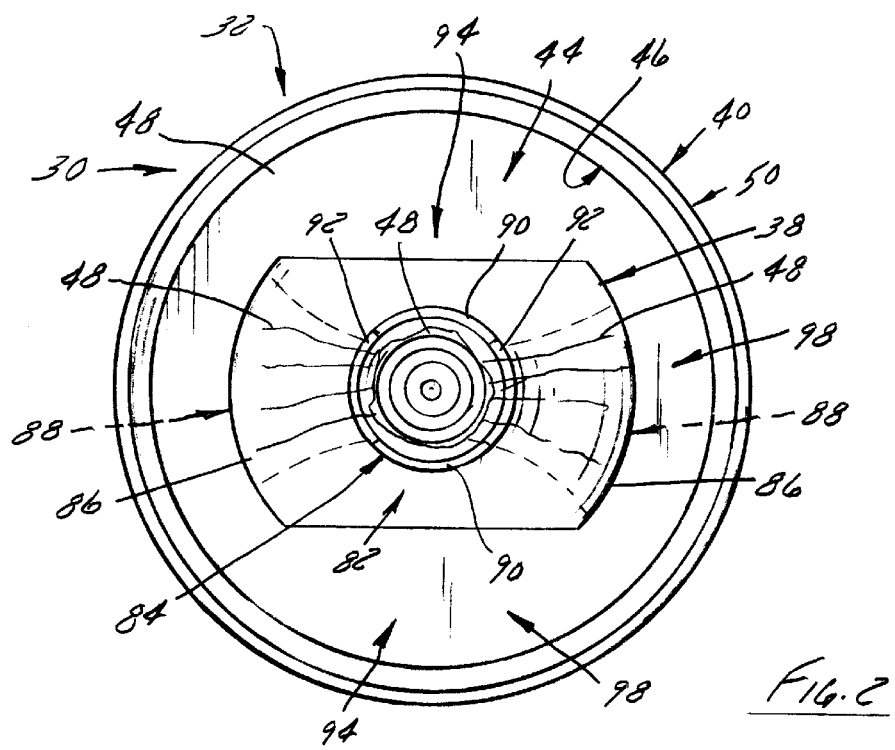
FIG. 2 is a top plan view of the fountain of FIG. 1.

Once fountain assembly is completed, the cover 38 remains attached to the basin 40 via the pump module 34 and lift tube 104 providing a cover mounting arrangement 100 that produces a fountain assembly that is simple, utilizes few parts, is quick to assemble, is easy to disassemble and reassemble, and which maintains or helps maintain a desired location of the cover 38 relative to the basin 40. Such a cover mounting arrangement 100 constructed in accordance with the present invention, can also be used where the fountain cover is located relative to the basin by a seating arrangement in which part of the cover seats in part of the basin, such as in the manner depicted in FIGS. 6 and 8. In either embodiment, the cover mounting arrangement 100 holds or anchors the cover 38 in place relative to the basin 40, opposing separation, including by maintaining contact between the cover 38 and the basin 40 once assembly is completed. When the cover 38 is assembled to the basin 40 in this manner, the cover 38 conceals the cord conduit 58 as well as the pump module 34 underneath it as shown in FIGS. 1 and 2.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

The invention claimed is:

1. A pump module for filtering and pumping water held in a basin of a pet fountain assembly, the pump module comprising:
    a module housing receivable in the fountain basin, wherein the module housing overlays at least a portion of a bottom of the fountain basin when the module is placed in the fountain basin, and the module housing having an inlet and an outlet;
    a pump carried by the module housing and spaced by the module housing above the bottom of the fountain basin when the module housing is placed in the fountain basin, the pump capable of receiving water in the fountain basin through the inlet of the module housing and delivering water out of the outlet of the module housing for conveying water through the pet fountain assembly; and
    a filter arranged between the inlet of the module housing and the pump so that when water enters through the module housing, the water flows through the filter before entering the pump; and
    wherein the module housing, pump and filter that comprise the pump module is capable of being inserted into and removed from the fountain basin as a unit.

2. The pump module of claim 1 wherein the inlet of the module housing is defined by a perforate grate formed in a downwardly facing surface of the module housing disposed adjacent the bottom of the fountain basin that faces generally downwardly toward the bottom of the fountain basin when the pump module is received in the basin.

3. The pump module of claim 1 wherein the inlet of the module housing comprises a perforate grate that is at least partially defined by a plurality of spaced apart openings formed in a downwardly facing surface of the module housing, and wherein at least a portion of at least one of the plurality of spaced apart openings generally overlies the bottom of the fountain basin and faces generally downwardly the bottom of the fountain basin when the pump module is received in the basin.

4. The pump module of claim 1 wherein the module housing comprises a lower surface facing a bottom of the fountain basin when the pump module is received in the basin, and wherein the inlet comprises a plurality of spaced apart columns of intake vents formed in the lower surface of the module housing with each column having a plurality of spaced apart intake vents.

5. The pump module of claim 1 wherein the module housing comprises a lower surface having a portion generally overlying and facing generally downwardly toward the bottom of the fountain basin when the pump module is received in the basin, wherein the inlet is comprised of a plurality of spaced apart intake vents formed in the portion of the lower surface of the module housing that generally overlies and faces generally downwardly toward the bottom of the fountain basin when the pump module is received in the basin, and wherein the plurality of spaced apart intake vents are positioned at a plurality of different heights above the bottom of the fountain basin when the pump module is received in the basin such that at least one of the plurality of the intake vents is spaced farther away from the bottom of the fountain basin than another one of the plurality of the intake vents when the pump module is received in the basin.

6. The pump module of claim 5 wherein at least one of the plurality of intake vents has a size that is different than the size of at least one other of the plurality of intake vents.

7. The pump module of claim 6 wherein at least one of the plurality of intake vents spaced farther from the bottom of the fountain basin when the pump module is received in the basin is relatively larger in size than at least one other of the plurality of intake vents spaced nearer to the bottom of the fountain basin when the pump module is received in the basin.

8. A pump module for filtering and pumping water held in a basin of a pet fountain assembly, the pump module comprising:
a module housing configured for removable mounting in the fountain basin, the module housing comprising an inlet and an outlet;
a pump disposed within the housing, the pump receiving water from the inlet of the module housing and discharging water out of the outlet of the module housing recirculating water through the pet fountain assembly; and
a filter disposed within the housing between the inlet of the housing and the pump so that when water enters through the module housing, the water flows through the filter before entering the pump, and
wherein the module housing comprises a first segment and a second segment removably engaging each other to define an enclosure around the pump and filter.

9. The pump module of claim 8 wherein one of the first and second segments comprises a bottom facing toward a bottom of the fountain basin when the module housing is removably mounted in the fountain basin, the bottom having the inlet of the module housing formed therein, and wherein the other one of the first and segment segments comprises a top facing away from the bottom of the fountain basin, the top comprising the outlet of the module housing.

10. The pump module of claim 8 wherein the inlet is comprised of a plurality of intake vents extending through one of the first and second segments of the module housing and facing toward a bottom of the fountain basin when the module housing is removably mounted in the fountain basin, and wherein the filter is arranged above the intake vents such that the filter generally overlies the intake vents so that water flows generally upwardly through the intake vents before flowing generally upwardly through the filter.

11. The pump module of claim 8 wherein one of the first and second segments of the module housing comprises a bottom that is at least partially curved and wherein the inlet is defined by multiple openings formed in the bottom of the module housing.

12. A pump module for filtering and pumping water held in a basin of a pet fountain assembly, the pump module comprising:
a module housing receivable in the fountain basin, the module housing overlying a bottom of the fountain basin when received in the fountain basin, and the module housing having an inlet and an outlet,
a pump carried by the module housing that receives water from the inlet of the module housing and delivers water out of the outlet of the module housing for conveying water through the pet fountain assembly;
a filter arranged between the inlet of the module housing and the pump so that when water enters through the module housing, the water flows through the filter before entering the pump; and
wherein the module housing further comprises an internal pump module divider wall that divides an interior of the module housing into (a) an intake chamber that receives water from the fountain basin entering the module housing through the inlet, and (b) a filtrate chamber where filtered water within the housing flows after it has passed through the filter.

13. The pump module of claim 12 wherein the filter is disposed within the module housing in fluid-flow communication with water flowing through the intake chamber upstream of the pump and the pump is disposed in the filtrate chamber downstream of the filter.

14. The pump module of claim 12 wherein the internal pump module divider wall comprises a filter seat against which the filter removably seats.

15. The pump module of claim 14 wherein the internal pump module divider wall provides a seal with the filter.

16. The pump module of claim 12 wherein the internal pump module divider wall is comprised of a pair of wall segments that converge to generally form a right angle corresponding to a shape of a corner of the pump disposed in the filtrate chamber, and wherein the pump comprises a submersible pump having a generally rectangular transverse cross section and a generally rectangular longitudinal cross section.

17. A pump module for filtering and pumping water held in a basin of a pet fountain assembly, the pump module comprising:
a pump module housing configured for removable mounting to a portion of the pet fountain assembly;
a submersible pump received within the pump module housing; and
a filter received within the pump module housing, and
wherein the pump module housing comprises a bottom and a top releasably secured to each other defining an enclosure surrounding the filter and the pump, the bottom of the pump module housing comprising a grate having openings facing a bottom of a basin of the pet fountain assembly through which water enters the pump module housing that is directed through the filter before entering the pump that discharges the water out of a discharge at the top of the pump module housing.

18. The pump module of claim 17 wherein the discharge comprises an outlet of the submersible pump.

19. The pump module of claim 18 wherein the outlet of the submersible pump comprises a tube, the discharge of the pump module housing comprises a tube, and the outlet of the submersible pump is disposed in telescopic registry with the discharge of the pump module housing.

20. The pump module of claim 17 wherein the pump module housing bottom has a surface in which the grate openings are formed that faces toward the fountain basin bottom when the pump module is received in the basin, and wherein the basin bottom facing surface of the pump module housing bottom is inclined relative to the fountain basin bottom spacing at least one of the grate openings farther away from the fountain basin bottom than another one of the grate openings when the pump module housing is removably mounted in the basin.

21. The pump module of claim 20 wherein the basin bottom facing surface of the pump module housing bottom in which the grate openings are formed is curved.

22. The pump module of claim 17 wherein the pump module housing bottom further comprises a filter seat that (a)

removably seats the filter and (b) divides the pump module housing into (i) an intake chamber downstream of the grate openings and upstream of the filter, and (ii) a filtrate chamber downstream of the filter and upstream of the pump.

23. The pump module of claim 22 wherein the filter is generally horizontally oriented when seated on the filter seat.

24. The pump module of claim 22 wherein the top of the pump module housing is rounded.

25. The pump module of claim 17 wherein the pump module housing further comprises (a) a hinge that enables relative movement between the top and bottom of the pump module housing between (i) an open position permitting access to the pump and filter, and (ii) a closed position enclosing the pump and filter within the pump module housing, and (b) a latch that releasably retains the top and bottom of the pump module housing in the closed position.

26. The pump module of claim 17 wherein the pump module housing comprises at least one suction cup for removable mounting of the pump module housing, and wherein the pump is removably mounted within the module housing by at least one suction cup.

27. A pump module for filtering and pumping water held in a basin of a pet fountain assembly, the pump module comprising:

a module housing configured for removable mounting between a cover of the pet fountain assembly and the fountain basin, the module housing defining an inlet and an outlet, the inlet comprised of a plurality of spaced apart intake vents extending through the module housing disposed adjacent to and facing toward a bottom of the fountain basin where the plurality of spaced apart intake vents generally overlie the bottom of the fountain basin when the pump module is received in the basin;

a submersible pump enclosed within the module housing that receives water through the intake vents of the inlet of the module housing and discharges water out of the outlet of the module housing; and a filter arranged between the intake vents of the inlet of the module housing and the pump, the filter overlying the intake vents of the inlet of the module housing so that water flows through the intake vents of the inlet of the module housing before flowing through the filter and thereafter flowing to the pump.

28. The pump module of claim 27 wherein the module housing comprises at least one elastomeric suction cup for removable mounting in the fountain basin and wherein the submersible pump comprises at least one elastomeric suction cup removably mounting the submersible pump within the module housing.

29. The pump module of claim 27 wherein the module housing spaces the pump above the bottom of the fountain basin when the pump module is removably mounted in the basin.

30. The pump module of claim 27 wherein the pump is removably mounted to the module housing within the module housing.

31. The pump module of claim 27 wherein the filter is enclosed within the module housing and disposed within the module housing alongside the pump.

32. The pump module of claim 27 wherein the filter is generally horizontally oriented.

33. The pump module of claim 27 wherein the module housing spaces the filter above the bottom of the fountain basin when the pump module is removably mounted in the basin.

34. A pump module for filtering and pumping water held in a basin of a pet fountain assembly, the pump module comprising:

a module housing configured for removable mounting in the fountain basin the module housing having a bottom facing generally downwardly toward a bottom of the fountain basin when the module housing is removably mounted in the fountain basin, the module housing defining an inlet and an outlet wherein the inlet is comprised of intake vents extending through the module housing and facing toward the bottom of the fountain basin when the module housing is removably mounted in the fountain basin;

a pump arranged within the module housing that receives water from the inlet of the housing and delivers water out of the outlet of the module housing for conveying water through the pet fountain assembly; and a filter arranged within the module housing between the inlet of the module housing and the pump, the filter disposed generally horizontally above the intake vents so that water flows generally upwardly away from adjacent the bottom of the fountain basin through the intake vents before flowing generally upwardly through the filter and then flowing to the pump.

35. The pump module of claim 34 wherein the outlet of the module housing comprises an outlet of the submersible pump.

* * * * *